United States Patent
Cerda

(10) Patent No.: US 12,313,363 B2
(45) Date of Patent: *May 27, 2025

(54) FIREARM MOUNTING DEVICE

(71) Applicant: Vulcan Arms, LLC, Dallas, TX (US)

(72) Inventor: Charlie R. Cerda, Katy, TX (US)

(73) Assignee: Vulcan Arms, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,301

(22) Filed: Dec. 12, 2023

(65) Prior Publication Data

US 2024/0133652 A1 Apr. 25, 2024

Related U.S. Application Data

(63) Continuation of application No. 18/109,753, filed on Feb. 14, 2023, now abandoned, which is a continuation of application No. 17/398,682, filed on Aug. 10, 2021, now Pat. No. 11,619,464, which is a continuation-in-part of application No. 16/520,161, filed on Jul. 23, 2019, now abandoned.

(60) Provisional application No. 62/701,935, filed on Jul. 23, 2018.

(51) Int. Cl.
F41A 23/18 (2006.01)
(52) U.S. Cl.
CPC .................. *F41A 23/18* (2013.01)
(58) Field of Classification Search
None
See application file for complete search history.

(56) References Cited

U.S. PATENT DOCUMENTS

| | | | |
|---|---|---|---|
| 3,307,755 A * | 3/1967 | Lentz | F41C 33/06 42/70.11 |
| 3,566,526 A | 3/1971 | LaViolette | |
| 3,746,177 A | 7/1973 | Vilotti | |
| 4,298,150 A | 11/1981 | Seldeen | |
| 4,521,930 A * | 6/1985 | Henson | F41A 23/00 5/503.1 |
| 4,852,780 A | 8/1989 | Woodbury | |
| 4,984,725 A | 1/1991 | Urbom | |
| 5,118,175 A | 6/1992 | Costello | |
| 5,454,931 A | 10/1995 | Lauve, Jr. | |
| 5,768,816 A | 6/1998 | Rassias | |
| 5,979,846 A | 11/1999 | Fluhr | |
| 6,951,289 B2 | 10/2005 | Scott, Jr. | |
| 7,584,861 B2 | 9/2009 | Werner | |
| 7,690,606 B1 | 4/2010 | Batdorf | |
| 8,403,278 B1 | 3/2013 | Kasbohm | |
| 8,727,294 B1 | 5/2014 | Harms | |

(Continued)

*Primary Examiner* — Monica E Millner
(74) *Attorney, Agent, or Firm* — Dentons US LLP; Victor C. Johnson

(57) ABSTRACT

A firearm mounting device securable to a surface and having a magnetic material within a base to attract and secure a firearm to the device in a readily retrievable position. The device includes a channel to receive the slide of a semi-automatic pistol and at least one slide stop disposed within the channel to engage and prevent movement of the slide as a user grips the grip of the pistol and displaces the grip towards the at least one slide stop to chamber a cartridge in the chamber of the pistol. The at least one slide stop engages and prevents movement of the slide while allowing the barrel of the pistol to protrude from under the slide.

10 Claims, 5 Drawing Sheets

(56) References Cited

U.S. PATENT DOCUMENTS

| | | | |
|---|---|---|---|
| 8,739,453 B1 | 6/2014 | Conner | |
| 8,752,742 B2 | 6/2014 | Clark et al. | |
| 8,955,697 B2 | 2/2015 | Spilotro | |
| 9,010,600 B1 | 4/2015 | Gleaton et al. | |
| 9,121,662 B1 * | 9/2015 | Love | F41C 27/00 |
| 9,261,326 B1 * | 2/2016 | Chandler | F41A 23/18 |
| 9,261,328 B2 | 2/2016 | Sitz | |
| 9,340,163 B2 | 5/2016 | Baker | |
| 9,360,273 B1 | 6/2016 | Steinbock | |
| 9,494,278 B2 | 11/2016 | Mantua | |
| 9,733,036 B2 | 8/2017 | Tucker et al. | |
| 10,145,650 B1 | 12/2018 | Terhark | |
| 10,234,235 B2 | 3/2019 | Higgins | |
| 10,302,392 B2 | 5/2019 | Waters | |
| 10,413,059 B2 | 9/2019 | Gautreaux | |
| 10,563,945 B2 | 2/2020 | Tucker et al. | |
| 11,619,464 B2 * | 4/2023 | Cerda | F41A 23/18 248/205.3 |
| 2002/0011504 A1 | 1/2002 | Cerato | |
| 2009/0218741 A1 | 9/2009 | Winnard | |
| 2009/0293334 A1 | 12/2009 | Swan | |
| 2012/0255979 A1 | 10/2012 | Sitz | |
| 2014/0158730 A1 | 6/2014 | McDonnell | |
| 2015/0013205 A1 | 1/2015 | Franklin | |
| 2015/0033609 A1 | 2/2015 | Herdman | |
| 2015/0129440 A1 | 5/2015 | Abascal | |
| 2016/0290755 A1 | 10/2016 | Folk | |
| 2017/0254608 A1 | 9/2017 | Agnelli, Jr. | |
| 2017/0350672 A1 | 12/2017 | Masteller | |
| 2017/0363379 A1 | 12/2017 | Zalavari | |
| 2018/0003461 A1 | 1/2018 | Higgins | |
| 2018/0087863 A1 | 3/2018 | Sexton | |
| 2019/0072357 A1 | 3/2019 | Couie | |
| 2019/0242669 A1 | 8/2019 | Agnelli, Jr. | |
| 2019/0322221 A1 | 10/2019 | Stephens et al. | |
| 2021/0063108 A1 | 3/2021 | Parsons | |

\* cited by examiner

FIREARM MOUNTING DEVICE

CROSS-REFERENCE TO RELATED APPLICATIONS

This application is a continuation of U.S. patent application Ser. No. 18/109,753, filed Feb. 14, 2023, which is a continuation of U.S. patent application Ser. No. 17/398,682, filed Aug. 10, 2021, now U.S. Pat. No. 11,619,464, which is a continuation-in-part of U.S. patent application Ser. No. 16/520,161, filed on Jul. 23, 2019, now abandoned, which claims the priority of U.S. Provisional Application Ser. No. 62/701,935 filed on Jul. 23, 2018, the entire disclosures of which are herein incorporated by reference in their entireties.

BACKGROUND

Field of the Invention

The present invention relates to a mounting device for firearms. More particularly, the present invention relates to a device for mounting a firearm that enables a user to use only one-hand in chambering a round prior to removing the firearm from the mounting device.

Background of the Related Art

Many users of firearms desire for their firearm to be readily accessible and quickly and easily retrieved so that it can be quickly used. For example, users that carry firearms in their motor vehicle may store the firearm in the glove compartment or console, but this approach is inconvenient if the user wishes to retrieve the firearm quickly. Other locations include laying the firearm on, under or around the seating areas. These storage locations are also inconvenient as the firearm may be easily dislodged in the case of quick acceleration, deceleration (i.e., accidents), or turns, or because the firearm may not be within easy reach of the user.

An example of one such mounting device that has attempted to address this issue is disclosed in U.S. Pat. No. 9,010,600 to Gleaton et al. As best can be determined, Gleason discloses a holster comprising a tension strap that can be mounted within a vehicle interior to securely hold a handgun. Problems with this type of device include difficulties in quickly removing the handgun for use in an emergency. Further, after removing the handgun from the holster, the user then needs to load a round into the handgun's chamber which requires additional time.

Similarly, it would be desirable to mount a handgun for storage of firearms in homes or other buildings that allows for easy accessibility of use during an emergency. While there are any number of means of storing firearms indoors such as gun safes, gun racks, and even personal holsters, it can be difficult to access and retrieve the firearm quickly. Further, even after retrieving the firearm from these other storage areas, there remains a need to load a round in the chamber before the firearm can be used.

BRIEF SUMMARY

One embodiment of the firearm mounting device of the present invention provides a device for supporting a semi-automatic pistol in a position and at a location so that the firearm is readily accessible to the user. One embodiment of the device of the present invention provides a firearm mounting device for supporting a semi-automatic pistol that enables the user to chamber a cartridge in the chamber of the pistol prior to removing the pistol from the mounting device. Embodiments of the firearm mounting device require only one hand to chamber a round in the chamber of a pistol and then to remove the pistol from the mounting device in a charged condition that is ready to use.

In one embodiment of the firearm mounting device of the present invention, the firearm mounting device is designed to support a firearm such as, for example, a semi-automatic pistol having a grip, a slide, a muzzle, a barrel, a chamber and a magazine that inserts into a bay within the grip. In one embodiment of the device of the present invention, the firearm mounting device not only receives and supports a semi-automatic pistol having these structures but enables the user to quickly grab the grip of the pistol and, with a push on the grip towards a distal end of the mounting device, stroke the slide of the pistol to thereby chamber a cartridge in the chamber to make the pistol ready to use upon removal from the mounting device. In one embodiment of the firearm mounting device of the present invention, the device includes a base having a magnetic material therein or thereon for magnetically attracting and for magnetically and removably securing a pistol to the firearm mounting device. In one embodiment of the firearm mounting device of the present invention, the device includes a base having a perimeter and a plurality of ears, each with a hole therein to receive screws or other fasteners to secure the device to a support structure such as a wall, a panel or some other support surface. In one embodiment, the ears with holes are distributed around a perimeter of the base to provide stability of the firearm mounting device upon installation on the wall, panel or other surface.

In one embodiment of the firearm mounting device of the present invention, the device includes a site slot in the base and proximal to a distal end of the base and to a distal end of the firearm mounting device to receive and accommodate the front site of a pistol when the pistol is magnetically secured to the base and to the firearm mounting device. In one embodiment of the firearm mounting device of the present invention, the site slot prevents the front site of a semi-automatic pistol to be secured in the device from obstructing the slide from being magnetically secured to the base with favorable flush contact and engagement between the slide and the base of the firearm mounting device. This site slot of such an embodiment thereby provides for closer contact and for a more forceful magnetic engagement between the slide of the pistol and the base of the firearm mounting device for optimal magnetic attraction of the pistol to the base and to thereby prevent unwanted or inadvertent disengagement of the pistol from the firearm mounting device by sudden movement, shaking or vibration of the surface on which the firearm mounting device is supported.

In one embodiment of the firearm mounting device of the present invention, the device includes a base having a first side and a second side, a proximal end and a distal end, and a channel that is formed intermediate opposing side walls which extend outwardly from a first side and a second side of the base. In one embodiment of the firearm mounting device of the present invention, the two spaced-apart side walls are separated one from the other by a channel having a width that allows the slide of a semi-automatic pistol to be inserted into the channel therebetween and to thereby allow a top surface of the slide of the pistol to fully contact and magnetically engage magnetic elements in or on the base of the firearm mounting device. In one embodiment of the firearm mounting device of the present invention, each of the first sidewall and the second sidewall includes a guide member that extends from the sidewall and is angled away from the adjacent channel. Together, the guide member extending from the first sidewall and the guide member from the second sidewall together form a convergent guide to assist the user in inserting the slide of a semi-automatic pistol into the channel formed between the first sidewall and the second sidewall, and to thereby assist the user in magnetically securing the pistol with the base and to thereby assist in moving the front site of the semi-automatic pistol towards the site slot formed in the base proximal to the distal end of the firearm mounting device.

In one embodiment of the firearm mounting device of the present invention, the channel includes one or more slide stops to obstruct at least a portion of the channel proximal to the distal end of the firearm mounting device and the adjacent distal end of the base and, upon movement of the semi-automatic pistol within the channel and along the base towards the distal end of the firearm mounting device and the adjacent distal end of the base, to engage the slide of a semi-automatic pistol to prevent the slide from further movement beyond the one or more slide stops as the grip is pushed by the user to chamber a cartridge. This allows the user to chamber a round as the barrel of the semi-automatic pistol protrudes from underneath the stationary slide and beyond the slide stops to chamber a cartridge into the chamber of the pistol. In one embodiment of the device of the present invention, the one or more slide stops comprises two slide stops that are rigid protrusions projecting into the distal end of the channel from the base. In one embodiment, a device having two slide stops protruding from the base into the distal end of the channel are positioned to straddle the site slot and are proximal to a bottom of the base, thereby providing a gap intermediate the slide stops.

Additional advantages, benefits and structures of the device of the present invention are disclosed in the description that follows.

DETAILED DESCRIPTION

Figure 1:
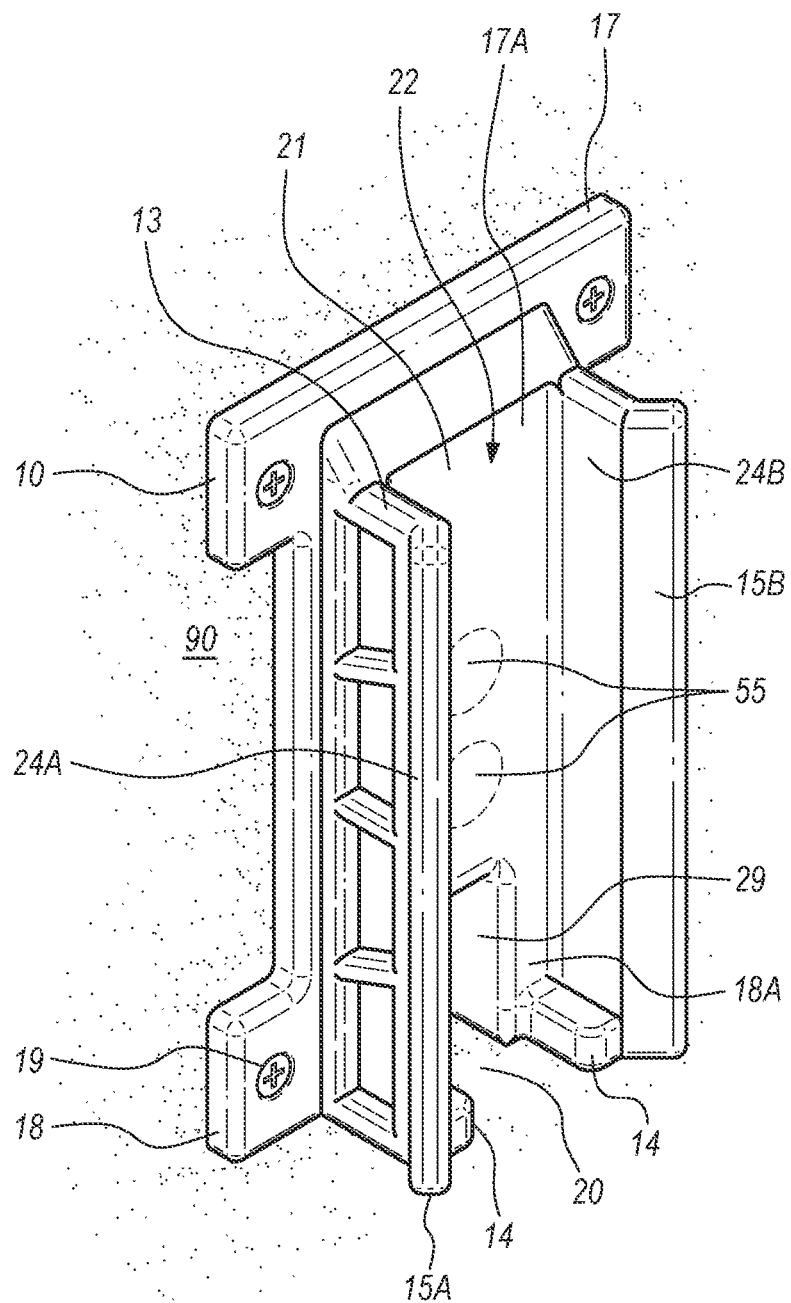
FIG. 1 is a perspective view of an embodiment of the firearm mounting device of the present invention secured to a support surface with screws.

FIG. 1 is a perspective view of an embodiment of the firearm mounting device 10 of the present invention secured to a support surface 90 with screws 19. The firearm mounting device of FIG. 1 includes a proximal end 17, a distal end 18, a base 21 having a proximal end 17A and a distal end 18A, a first side wall 24A extending from the base 21, a second side wall 24B extending from the base 21 and spaced apart from the first side wall 24A, and a channel 22 adjacent to the base 21 and intermediate the first side wall 24A and the second side wall 24B. The channel 22 of the firearm mounting device 10 of FIG. 1 extends from the proximal end 17 of the firearm mounting device 10 to the distal end 18 of the firearm mounting device 10. The base 21 of the firearm mounting device 10 of FIG. 1 further includes magnetic elements 55 disposed on, within or adjacent to the base 21 and intermediate the first side wall 24A and the second side wall 24B. The firearm mounting device 10 of FIG. 1 further includes a first guide member 15A extending from the first side wall 24A and a second guide member 15B extending from the second side wall 24B and spaced apart from the first guide member 15A. The first guide member 15A and the second guide member 15B together form a convergent guide that assists the user in disposing the slide 82 (not seen in FIG. 1) into the channel 22 of the firearm mounting device 10.

The firearm mounting device 10 of FIG. 1 further includes two slide stops 14 proximal to the distal end 18 of the firearm mounting device 10 and to the distal end 18A of the base 21. One of the slide stops 14 of the firearm mounting device 10 of FIG. 1 protrudes from the base 21, along the first side wall 24A proximal to the distal end 18A of the base 21, and into the channel 22. The other of the two slide stops 14 of the firearm mounting device 10 of FIG. 1 protrudes from the base 21, along the second side wall 24B proximal to the distal end 18A of the base 21, and into the channel 22, and there is a gap 20 formed in between the two slide stops 14. The two slide stops 14 of the firearm mounting device 10 straddle an adjacent site slot 29 that is formed in the base 21 and is proximal to the distal end 18 of the firearm mounting device 10. The site slot 29 receives and accommodates the front site of a semi-automatic pistol (not shown in FIG. 1) when the slide of the pistol is received into the channel 22 and magnetically secured to the base 21 of the firearm mounting device 10.

Figure 2:
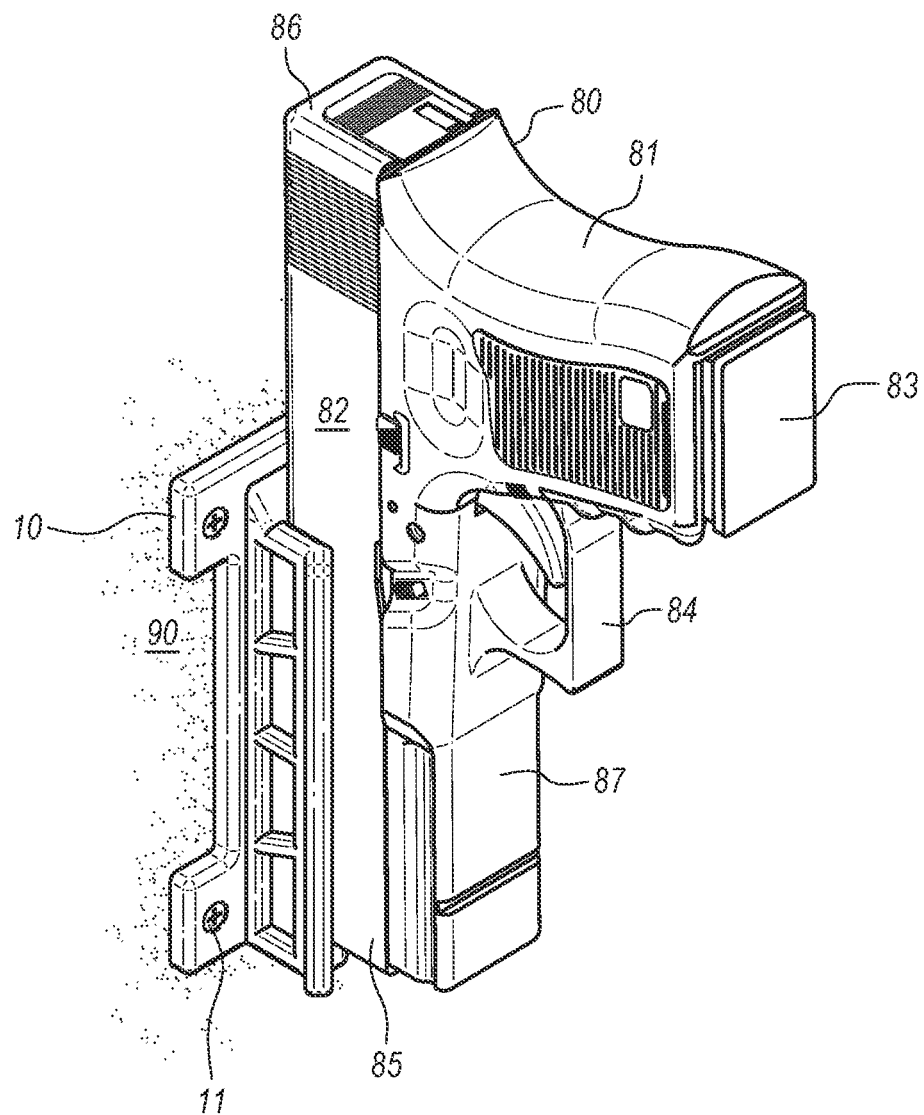
FIG. 2 is the perspective view of FIG. 1 after a semi-automatic pistol having a slide, a barrel (not seen in FIG. 2), a chamber (not seen in FIG. 2) and a grip is disposed into a channel of the firearm mounting device and magnetically secured to a base of the firearm mounting device.

FIG. 2 is the perspective view of the firearm mounting device 10 of FIG. 1 after a semi-automatic pistol 80, having a slide 82, a barrel 89 (not seen in FIG. 2), a muzzle 85, a chamber (not seen in FIG. 2) and a grip 81, is received into a channel 22 (obscured by pistol 80 in FIG. 2) of the firearm mounting device 10 and magnetically secured to the base 21 of the firearm mounting device 10. The pistol 80 in FIG. 2 further includes a magazine 83 in which a plurality of cartridges (not seen in FIG. 2) are stacked and from which cartridges may be fed to the chamber (not seen in FIG. 2) of the pistol 80. The pistol 80 of FIG. 2 further includes a trigger guard 84. The pistol 80 shown in FIG. 2 is magnetically secured to the base 21 of the firearm mounting device 10 because the magnetic elements 55 (not seen in FIG. 2) attract and magnetically secure the slide 82 and/or other magnetic materials of the pistol 80 within the channel 22.

Figure 3:
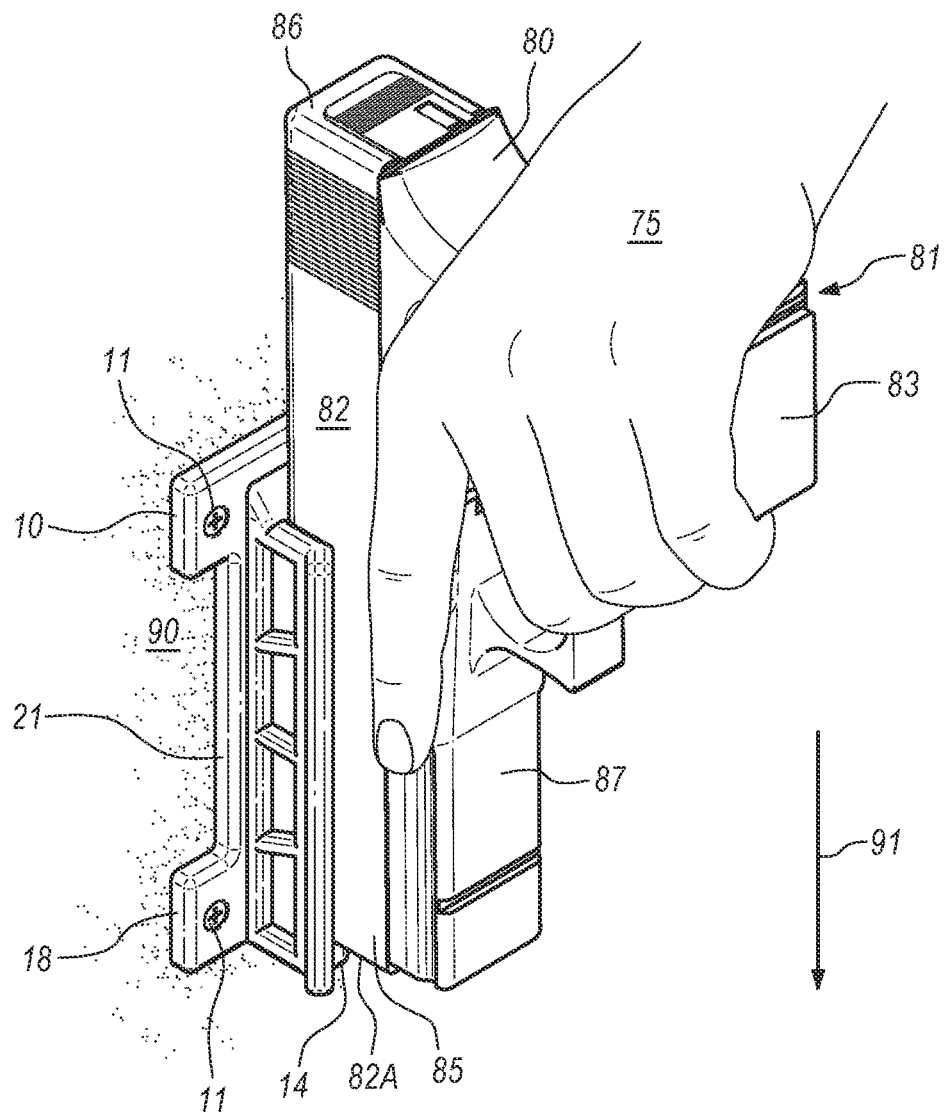
FIG. 3 is the perspective view of FIG. 2 after a user has placed a hand on the grip of the semi-automatic pistol that is magnetically secured within the channel of the firearm mounting device.

FIG. 3 is the perspective view of FIG. 2 after a user has placed a hand 75 on the grip 81 of the semi-automatic pistol 80 that is magnetically secured within the channel 22 of the firearm mounting device 10. The nose 82A of the slide 82 of the pistol 80 is in engagement with the slide stops 14 (not seen in FIG. 3—see FIG. 1), which prevents the pistol 81 from sliding downwardly in the direction of arrow 91.

Figure 4:
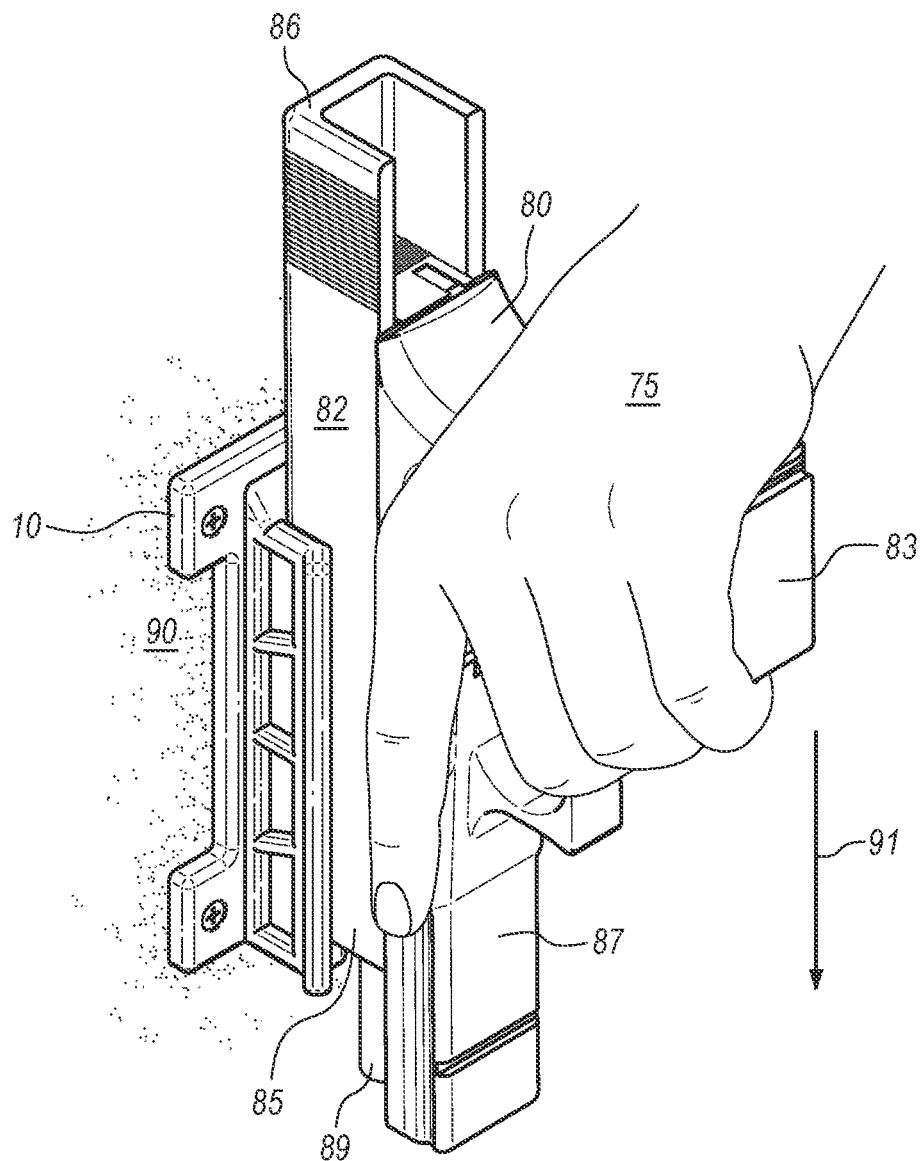
FIG. 4 is the perspective view of FIG. 3 after the user pushes the grip of the semi-automatic pistol downwardly within the channel of the firearm mounting device to engage the slide of the semi-automatic pistol with slide stops (not seen in FIG. 4) protruding into the distal end of the channel proximal to a distal end of the base and then, with continued application of pressure on the grip of the pistol, to cause the barrel of the pistol to protrude beyond the slide stops of the firearm mounting device as the slide remains stationary due to engagement with the slide stops.

FIG. 4 is the perspective view of the firearm mounting device 10 of FIG. 3 after the user's hand 75 grips the grip 81 of the pistol 80 and then pushes the grip 81 of the pistol 80 downwardly in the direction indicated by arrow 91 within the channel 22 of the firearm mounting device 10 to firmly engage the nose 82A of the slide 82 of the pistol 80 with the slide stops 14 that protrude into the channel 22 proximal to a distal end 18 of the base 21 and then, the user applies continued downwardly force to the grip 81 with the hand 75 to displace the grip 81 of the pistol 80 downwardly to cause the barrel 89 (not seen in FIG. 4—see FIG. 5) of the pistol 80 to protrude beyond the slide stops 14 of the firearm mounting device 10 as the slide 82 of the pistol 80 remains stationary relative to the firearm mounting device 10 due to engagement of the nose 82A of the slide 82 with the slide stops 14. The rear 86 of the slide 82 will also remain stationary as the reminder of the pistol 80 moves downwardly in the direction of arrow 91 due to the force applied by the user. Returning to FIG. 1, it can be seen that the two slide stops 14 are separated one from the other by a gap 20 that receives the protruding barrel 89 shown in FIG. 4 when the user urges the grip 81 downwardly. Those familiar with semi-automatic pistols will understand that this action demonstrated in FIG. 4 causes a cartridge from the magazine 83 to be chambered within the chamber of the pistol 80, thereby making the pistol 80 ready for removal from the firearm mounting device 10 and available for instant use.

Figure 5:
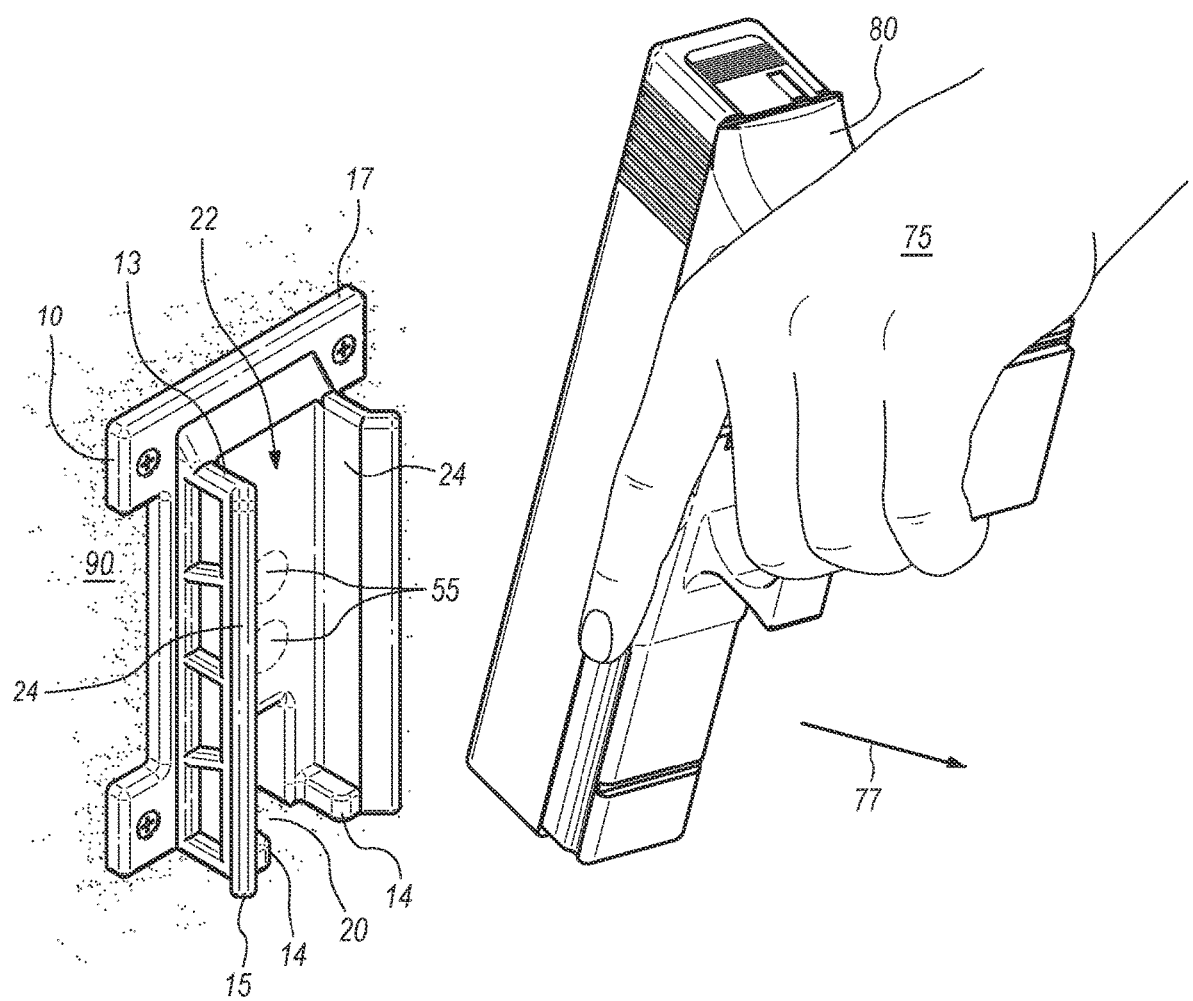
FIG. 5 is the perspective view of FIG. 4 after the user first releases force against the grip to allow the slide of the pistol to return to its original position and the barrel of the pistol to be covered by the slide, and then to pull on the grip to remove the pistol from the channel of the firearm mounting device after a cartridge (not seen in FIG. 5) is chambered within the chamber of the pistol.

FIG. 5 is the perspective view of FIG. 4 after the user releases force against the grip 81 to allow the barrel 89 of the pistol 10 to retract from its protruding position shown in FIG. 4 and then to pull on the grip 81 to remove the pistol 80 from the channel 22 of the firearm mounting device 10 after a cartridge (not seen in FIG. 5) is chambered within the chamber of the pistol 80. The pistol 80 is removed from the channel 22 by the user by gripping the grip 81 of the pistol 80 with a hand 75 and urging the pistol 80 in the direction of the arrow 77. The pistol 80 is now charged and ready for use.

While the firearm mounting device 10 illustrated in FIGS. 1-5 is shown to be secured to a surface 90 using screws 19, it will be understood that the firearm mounting device 10 may be secured in other ways such as, for example, but not by way of limitation, adhesives, hook and loop fasteners, brackets, clamps, magnets, etc.

In one embodiment, the firearm mounting device 10 of the present invention may be coated with a material that will not scratch or score the surface of the slide 82 or other components of the pistol 80.

In one embodiment, the firearm mounting device 80 of the present invention may include one, two or more magnetic elements 55 to attract and magnetically secure the pistol 80 within the channel 22 of the firearm mounting device 10. In one embodiment, the one, two or more magnetic elements 55 may comprise a rare earth magnetic element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A firearm mounting device, comprising:
a base having a top and a bottom;
at least one magnetic element;
a first side wall coupled to the base;
a second side wall coupled to the base, the second side wall being spaced apart from the first side wall to provide a channel intermediate the first side wall and the second side wall; and
at least one slide stop disposed on one of the first side wall, the second side wall and the base, the at least one slide stop being proximal to the bottom of the base;
wherein the channel is sized to receive a slide of a semi-automatic pistol into close proximity to the at least one magnetic element, wherein the at least one magnetic element magnetically secures the semi-automatic pistol within the channel.

2. The firearm mounting device of claim 1, further comprising:
a site slot in the base and proximal to the at least one slide stop.

3. The firearm mounting device of claim 2 wherein the at least one slide stop comprises a first slide stop and a second slide stop that is spaced apart from the first slide stop.

4. The firearm mounting device of claim 3, wherein the site slot is intermediate the first slide stop and the second slide stop.

5. The firearm mounting device of claim 1, wherein the at least one magnetic element is a rare earth magnetic element.

6. The firearm mounting device of claim 1, further comprising a non-scratch coating applied to the channel.

7. The firearm mounting device of claim 1, wherein the base includes a plurality of ears distributed about a perimeter of the base, each of the plurality of ears sized to receive a fastener therethrough for securing the firearm mounting device to a structure.

8. The firearm mounting device of claim 1, wherein each of the first side wall and the second side wall includes a bottom edge secured to the base and a top edge.

9. The firearm mounting device of claim 1, wherein the top edge of the first side wall and the top edge of the second side wall form an elongate opening to the channel.

10. The firearm mounting device of claim 9, further comprising:

a first guide member disposed along the top edge of the first side wall; and a second guide member disposed along the top edge of the second side wall;

wherein the first guide member and the second guide member together form a guide that is convergent towards the opening of the channel.

\* \* \* \* \*